(12) United States Patent
Krause (10) Patent No.: US 8,953,352 B2
(45) Date of Patent: Feb. 10, 2015

(54) CONTROLLER AND A METHOD FOR A DC CONVERTER, AND ALSO A DC CONVERTER

(75) Inventor: Axel Krause, Nesslau (CH)

(73) Assignee: BRUSA Elektronik AG, Sennwald (CH)

( * ) Notice: Subject to any disclaimer, the term of this patent is extended or adjusted under 35 U.S.C. 154(b) by 275 days.

(21) Appl. No.: 13/643,090

(22) PCT Filed: May 3, 2011

(86) PCT No.: PCT/IB2011/051948
§ 371 (c)(1),
(2), (4) Date: Nov. 5, 2012

(87) PCT Pub. No.: WO2011/138736
PCT Pub. Date: Nov. 10, 2011

(65) Prior Publication Data
US 2013/0038303 A1    Feb. 14, 2013

Related U.S. Application Data

(60) Provisional application No. 61/332,185, filed on May 6, 2010.

(30) Foreign Application Priority Data

May 6, 2010    (EP) .................................... 10162157

(51) Int. Cl.
*H02M 7/5387*    (2007.01)
*H02M 3/158*    (2006.01)
*H02M 1/00*    (2006.01)

(52) U.S. Cl.
CPC .... *H02M 3/1584* (2013.01); *H02M 2001/0048* (2013.01); *H02M 2003/1586* (2013.01); *Y02B 70/1491* (2013.01)
USPC ................ 363/132; 363/17; 363/98; 323/271

(58) Field of Classification Search
USPC ................. 323/271, 272, 266, 274, 275, 277, 323/282–286, 288–290, 351, 910; 363/15–18, 21.02, 21.03, 56.01, 56.02, 363/84, 89, 95, 98, 71, 123, 125–127, 363/131–132
See application file for complete search history.

(56) References Cited

U.S. PATENT DOCUMENTS 3,517,300 A * 6/1970 McMurray ...................... 363/25
4,017,784 A * 4/1977 Simmons et al. ............... 363/17
(Continued)

FOREIGN PATENT DOCUMENTS

DE      10123518 A1    11/2001
DE    102007050228 A1     4/2009
EP       1506613 A1     2/2005

OTHER PUBLICATIONS

International Search Report and International Preliminary Report on Patentability, dated Mar. 26, 2012 from parent International Application PCT/IB2011/051948 published WO2011/138736A1 on Nov. 10, 2011.

(Continued)

*Primary Examiner* — Adolf Berhane
*Assistant Examiner* — Nusrat Quddus
(74) *Attorney, Agent, or Firm* — George Kapsalas; Patentbuero Paul Rosenich AG (57) ABSTRACT

A controller (2) and a method for a DC converter (1), wherein the DC converter (1) comprises an input (E), an output (A), a connection to ground (GND), and also at least two half-bridges with two switching elements each (TR1 . . . TR4) connected in series and an inductance (L1, L2) each connected with the point connecting the two switching elements. In accordance with the invention the controller (2) is equipped to measure the current (IL1, IL2) through the inductances (L1, L2), and controls the switching elements (TR2, TR4)/(TR1, TR2) positions on the ground side/input side always with negative/positive current through the inductance (L1, L2) into an off-state. Finally a DC converter (1) connected with the controller (2) is also specified.

20 Claims, 3 Drawing Sheets

(56) References Cited

U.S. PATENT DOCUMENTS

| | | | |
|---|---|---|---|
| 4,533,986 A * | 8/1985 | Jones | 363/17 |
| 5,066,900 A * | 11/1991 | Bassett | 323/224 |
| 5,157,592 A * | 10/1992 | Walters | 363/17 |
| 5,875,103 A * | 2/1999 | Bhagwat et al. | 363/17 |
| 5,933,331 A * | 8/1999 | Boldin et al. | 363/16 |
| 5,949,669 A * | 9/1999 | Bruckmann et al. | 363/132 |
| 6,016,258 A * | 1/2000 | Jain et al. | 363/17 |
| 6,487,092 B2 | 11/2002 | Nishikawa | |
| 6,771,518 B2 * | 8/2004 | Orr et al. | 363/16 |
| 6,839,252 B2 | 1/2005 | Tai et al. | |
| 6,917,531 B2 | 7/2005 | Scheel et al. | |
| 6,985,034 B1 * | 1/2006 | Prokin et al. | 330/251 |
| 7,215,040 B2 | 5/2007 | Fang et al. | |
| 7,646,152 B2 | 1/2010 | Chiou | |
| 7,768,800 B2 | 8/2010 | Mazumder et al. | |
| 7,932,685 B2 | 4/2011 | Arimura et al. | |
| 8,009,443 B2 * | 8/2011 | Krause | 363/17 |
| 8,199,544 B2 * | 6/2012 | Krause et al. | 363/132 |
| 8,213,188 B2 | 7/2012 | Tada et al. | |
| 8,379,421 B2 * | 2/2013 | Nishijima | 363/84 |
| 8,411,473 B2 | 4/2013 | Cheng et al. | |
| 8,503,208 B2 * | 8/2013 | Krause | 363/127 |
| 8,693,214 B2 * | 4/2014 | Krause | 363/21.02 |
| 8,723,487 B2 * | 5/2014 | Pahlevaninezhad et al. | 323/225 |
| 2002/0003419 A1 | 1/2002 | Nishikawa | |
| 2006/0279966 A1 | 12/2006 | Fan et al. | |
| 2009/0103339 A1 | 4/2009 | Schill | |
| 2009/0129131 A1 * | 5/2009 | Hosemans | 363/89 |
| 2009/0230899 A1 | 9/2009 | Arimura et al. | |
| 2014/0177300 A1 * | 6/2014 | Lagorce et al. | 363/71 |
| 2014/0268899 A1 * | 9/2014 | Hosotani | 363/17 |

OTHER PUBLICATIONS

European Search Report and EPO preliminary report on patentability dated Nov. 22, 2010 from priority EPO application No. EP10162157.

Skudelny, Hans-Christoph, Stromrichtertechnik, published 1994 by Verlag der Augustinus Buchhandlung, Aachen Germany; pp. 95-104 and 116-133; pp. 119-121, 131-132 noted in written opinion by EPO.

Mohan, N.; Undeland, T.M., and Robbins, W.P., Power Electronics: Converters, Applications and Designs, published 1989 by John Wiley & Sons, New York, NY; pp. 11-15, 246-253, 514, 515. (English).

Abedinpour, S. et al. "A Multistage Interleaved Synchronous Buck Converter With Integrated Output Filter in 0.18m SiGe Process," in IEEE Transactions on Power Electronics, vol. 22, No. 6, Nov. 1, 2007, pp. 2164-2175; ISSN: 0885-8993.

Yingqi, Zhang et al. "A New Soft Switching Technique for Buck, Boost and Buck-Boost Converters," 2002 IEEE Industry Applications Conference, 37th IAS Annual Meeting Pittsburgh, PA; vol. 4, Oct. 13, 2002; ISBN: 978-0-7803-7420-1.

* cited by examiner

CONTROLLER AND A METHOD FOR A DC CONVERTER, AND ALSO A DC CONVERTER

This application is a 35 U.S.C. 371 national-phase entry of PCT International application no. PCT/IB2011/051948 filed on May 3, 2011 and also claims benefit of priority to prior European application no. EP10162157 filed on May 6, 2010, and also claims priority as a non-provisional of U.S. provisional application Ser. No. 61/332,185 filed on May 6, 2010; both European application no. EP10162157 and U.S. provisional application Ser. No. 61/332,185 are incorporated herein by reference in their entireties for all intents and purposes, as if identically set forth in full herein.

The invention concerns a controller for a DC converter, wherein the DC converter comprises an input, an output and a connection to ground, and also at least one half-bridge with two switching elements connected in series between the input and the connection to ground, and one inductance connected with the point connecting the switching elements and the output of the DC converter, and wherein the controller is equipped for purposes of activating the switching elements such that an alternating current is set up in the inductance.

Furthermore, the invention concerns a DC converter, comprising an input, an output, a connection to ground, and at least one half-bridge with two switching elements connected in series between the input and the connection to ground, and one inductance connected with the point connecting the switching elements and the output of the DC converter, wherein the DC converter is connected with an aforementioned controller, or comprises the latter.

Finally the invention concerns a method for the activation of a DC converter, which comprises an input, an output and a connection to ground, and also at least one half-bridge with two switching elements connected in series between the input and the connection to ground, and one inductance connected with the point connecting the switching elements and the output of the DC converter, wherein the switching elements are activated such that an alternating current is set up in the inductance.

A power converter that converts an input voltage by means of periodic switching into (another) output voltage is designated as a DC converter, or also as a DC/DC transformer. Buck converters (also known as step-down converters) and boost converters (also known as step-up converters) are the basic types of known art. MOSFETs (Metal Oxide Semiconductor Field Effect Transistors), bipolar transistors, or also IGBTs (Insulated Gate Bipolar Transistors), and thyristors, are for example deployed as switches (also called valves).

The present invention concerns a combined DC converter, i.e. a buck/boost converter or a step-down/step-up converter, in which at least one half-bridge is connected via an inductance with an output. Such a structure is in principle of known art from U.S. Pat. No. 6,839,252 B2, which discloses a DC/DC converter in which any number of half-bridges are connected in each case via an inductance with an output of the converter, i.e. with the load.

Disadvantageous in the circuits of known art are the poor EMC (electromagnetic compatibility) characteristics; these are primarily caused by the "hard" switch-over of the switching elements, which usually take the form of transistors. In the context of the invention a "hard" switch-over is understood to mean a switching process that takes place without properly taking into consideration the conditions in the switching element, for example, the charges held in the transistor.

The object of the invention is therefore to specify an improved controller and an improved method for a DC converter, and also an improved DC converter. In particular the electromagnetic compatibility is at the same time to be improved, and the power dissipation is to be further reduced.

This object is achieved in accordance with the invention by means of a controller of the type cited above, which for this purpose is equipped to measure the current through the inductance of the DC converter, and a) then to control the switching element positioned on the ground side of the DC converter into an off-state, if the current is flowing from the output of the DC converter to the inductance and has achieved a first specifiable magnitude that is greater than zero, and b) then to control the switching element positioned on the input side of the DC converter into an off-state, if the current is flowing from the inductance to the output of the DC converter, and has achieved a second specifiable magnitude that is greater than zero.

The object of the invention is also achieved by means of a DC converter of the type cited above, which is connected with a controller in accordance with the invention, or comprises the latter.

Finally, the object of the invention is achieved by means of a method of the type cited above, comprising the steps:

measurement of the current through the inductance, and a) control of the switching element positioned on the ground side into an off-state, if the current is flowing from the output to the inductance and has achieved a first specifiable magnitude that is greater than zero, and b) control of the switching element positioned on the input side into an off-state, if the current is flowing from the inductance to the output and has achieved a second specifiable magnitude that is greater than zero.

As a result of the measures in accordance with the invention, the EMC characteristics of the DC converter are significantly improved. This is achieved in that instead of the "hard" switch-over of the switching elements, a passive commutation of the latter is awaited before the switch-over takes place. In concrete terms, waiting occurs until the current through the inductance after passage through zero provides sufficient energy to recharge the capacitances of the switching element concerned, and also external capacitances. The larger the capacitances that are to be recharged, the more energy is also required, that is to say, the higher should also be the magnitude of the current cited to enable the passive commutation.

Provision can also be made that the passive commutation is not fully awaited, or enabled. In this case a mixed form of a "hard" switch-over and passive commutation would result; this does not improve the EMC characteristics to the best possible extent, but does, however, improve them relative to a purely "hard" switch-over.

In the context of the invention the term "switching elements" can be understood to include all switches that in principle allow a flow of current in both directions. In particular, these are understood to include transistors with an intrinsic anti-parallel diode, e.g. MOSFETs, but also transistors that do not actually have an intrinsic anti-parallel diode, but with which an external diode is connected in anti-parallel. An example of a transistor without an intrinsic anti-parallel diode is a bipolar transistor, with which an external diode must be connected in anti-parallel. The combination of transistor and external anti-parallel diode is then understood to be a "switching element". Needless to say, however, an external diode can also be connected in anti-parallel with e.g. a MOSFET. In this case both the intrinsic diode and also the external diode are active.

Advantageous embodiments and further developments of the invention now ensue from the present disclosure including the description, together with the figures of the drawings, and are disclosed by means of these.

It is advantageous if n half-bridges are provided, connected in parallel, and the controller is equipped for synchronous frequency activation, phase-displaced by 360°/n, of the switching elements, such that alternating currents, phase-displaced by 360°/n, are set up in the inductances. In this manner a "current ripple" of the DC converter, in other words a fluctuation of the current, can be reduced. This is achieved in that phase-displaced individual currents with comparatively high ripple are added together and thus provide a summation current with a comparatively small ripple. In this manner the rather disadvantageous effect on the current characteristics brought about as a result of the alternating magnetisation of the inductance can be alleviated.

It is particularly advantageous if for this purpose the controller is equipped to set up an amplitude of the alternating current resulting from the first and the second current magnitudes with a first average value for the alternating current that is smaller than in the case of a second larger average value. The aforementioned alternating magnetisation of the inductance of the DC converter is the cause of comparatively high energy losses. To reduce these losses the amplitude of the alternating current in the inductance, and thus the power dissipation of the latter, is reduced. In particular an improved ratio of effective power to power dissipation, in other words an improved efficiency, ensues with small output currents of the DC converter.

It is also particularly advantageous if the controller is equipped to provide a specifiable time pause between the switch-on and switch-off of the input-side switching element, and the switch-off and switch-on of the ground-side switching element. The recharging of capacitances during the switch-over process does not take place instantaneously, but requires a certain length of time. In this variant of the invention the switch-on of a switching element is delayed for the time required for these recharging processes to be essentially complete. The passive commutation is thereby enabled, and the bridge point avoids being actively, i.e. in a "hard" manner, pulled to another voltage level by an opposing switching element. Furthermore, any short-circuit of the bridge is avoided by means of the pause.

Here it is advantageous if the pauses are of equal length. The provision of a pause can thereby be implemented in a simple manner.

However, in this context it is also advantageous if a) the pause between the switch-off of the input-side switching element and the switch-on of the ground-side switching element is shorter than the pause between the switch-off of the ground-side switching element and the switch-on of the input-side switching element, if the alternating current on average is flowing from the inductance to the output, and/or b) the pause between the switch-off of the input-side switching element and the switch-on of the ground-side switching element is longer than the pause between the switch-off of the ground-side switching element and the switch-on of the input-side switching element, if the alternating current on average is flowing from the output to the inductance.

In this variant of the invention account is taken of the fact that the level of the current through the inductance at the point in time of the switch-over of the switching elements has an influence on the duration of the recharging processes of the capacitances. In order to adapt the pause between the switch-off of the one switching element and the switch-on of the other switching element to the current conditions that are present, pauses of different length are provided. The ratio of the pauses can thereby also be continuously adapted to the level of the average output current of the DC converter.

An advantageous embodiment of the controller in accordance with the invention is also provided if this is equipped for purposes of activating the switching elements with a switching frequency (e.g. 40-160 kHz), wherein the current through the inductance alternates its direction twice by means of appropriate activation of the switching elements in each period of the switching frequency. In this manner improved EMC characteristics (less EMC interference) are achieved in each commutation process. Also the measurement of current should take place correspondingly quickly. For example, it can take place across a current measurement resistance (shunt), on which the voltage drop is measured. Standard microcontrollers with an integrated analogue-digital converter (ADC), which can form the basis for the controller in accordance with the invention, are as a rule sufficiently fast to be able to fulfil the requirements cited. Moreover, special ADC modules exist which are even faster and can likewise be deployed if required. Finally, to speed up current measurement also analogue measurement circuits may be used.

It is beneficial for a DC converter if a first capacitance is connected in parallel with each switching element of a half-bridge in each case. While additional capacitances on the switching elements do indeed prolong the duration of the recharging process during commutation, since the time-wise variation dU/dt of the voltage is reduced, they also thereby act so as to smooth the voltage profile and can thus overall contribute to improved EMC characteristics.

It is also advantageous for a DC converter if a second capacitance is provided between the output and the connection to ground. In this manner the output voltage can be smoothed, so that a load downstream of the DC converter is not affected so strongly by voltage fluctuations.

It is moreover advantageous for a DC converter if a third capacitance is provided between the input and the connection to ground. In this manner the input voltage can be smoothed, so that a current source upstream of the DC converter is not affected so strongly by voltage fluctuations.

At this point it is noted that the variants cited with reference to the controller in accordance with the invention, and the advantages resulting from these, relate to an equal extent to the method in accordance with the invention, and vice versa. Similarly, the variants and advantages cited with reference to the controller in accordance with the invention, or to the method in accordance with the invention, relate to an equal extent to the DC converter in accordance with the invention, and vice versa.

Furthermore, it is noted that the method in accordance with the invention, and/or the controller in accordance with the invention, can be implemented in software and/or in hardware. If the invention is implemented in software, then a program, which runs in a microprocessor or a microcontroller, embodies the steps in accordance with the invention. Needless to say the invention can also be implemented just in hardware, for example, using an ASIC (Application Specific Integrated Circuit). The latter can, however, also include a processor. Finally one part of the invention can be implemented in software, and another part in hardware.

The above embodiments and further developments of the invention can be combined in any manner.

In what follows the present invention is described in more detail with the aid of the examples of embodiment schematically represented in the figures of the drawing. In the figures.

In the figures of the drawing the same and similar parts are provided with the same reference symbols, and functionally similar elements and features—insofar as this is not explained otherwise—are provided with the same reference symbols, but different indices.

Figure 1:
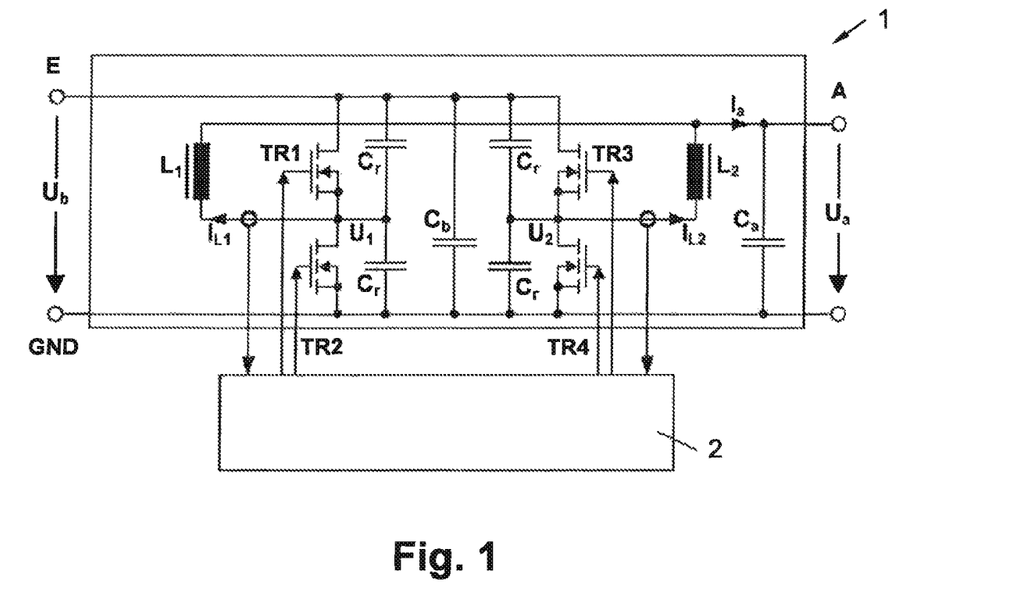
FIG. 1 shows schematically a variant of the DC converter in accordance with the invention.

FIG. 1 shows a DC converter 1 with an input E, an output A, and a connection to ground GND. The DC converter 1 comprises n>=1 (here in actual fact 2) half-bridges connected in parallel, which in each case comprise two switching elements TR1 ... TR4 connected in series between the input E and the connection to ground GND; in this example these are formed by transistors with intrinsic anti-parallel diodes—e.g. MOSFETs. Needless to say, switching elements without inherent anti-parallel diodes can also be deployed, if an external diode is connected in anti-parallel with them. Furthermore an inductance L1, L2 connected with the point connecting the transistors TR1 ... TR4 and the output A of the DC converter is provided for each half-bridge.

In this example, moreover, for each transistor TR1 ... TR4 of a half-bridge a first capacitance Cr is connected in parallel in each case. Moreover, a second capacitance Ca is provided between the output A and the connection to ground GND, and a third capacitance Cb is provided between the input E and the connection to ground GND.

Moreover, the DC converter 1 comprises a controller 2 for purposes of synchronous frequency activation, phase-displaced by 360°/n, of the transistors TR1 ... TR4, wherein phase-displaced alternating currents IL1, IL2 are set up in the inductances L1, L2. In accordance with the invention, the controller 2 is equipped to measure the current IL1, IL2 through the inductance L1, L2, and a) then to control the transistor TR2, TR4 positioned on the ground side into an off-state, if the current IL1, IL2 is flowing from the output A to the inductance L1, L2 and has achieved a first specifiable magnitude that is greater than zero, and b) then to control the transistor TR1, TR3 positioned on the input side into an off-state, if the current IL1, IL2 is flowing from the inductance L1, L2 to the output A and has achieved a second specifiable magnitude that is greater than zero.

Figure 2:
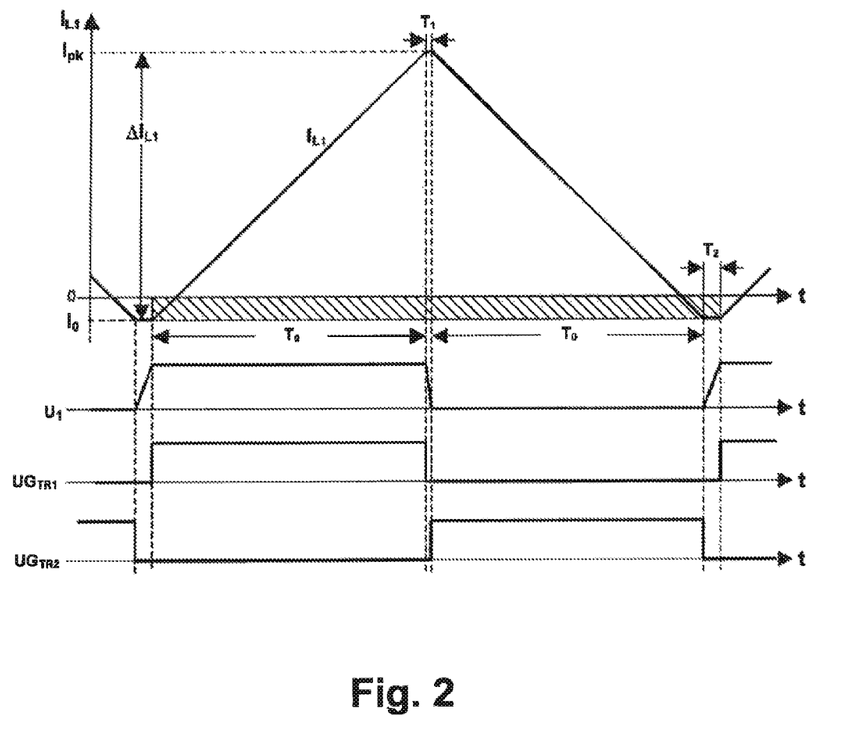
FIG. 2 shows an example of a current characteristic in an inductance of the DC converter in accordance with the invention.

The function of the DC converter 1 represented in FIG. 1 is now described in more detail with the aid of FIG. 2.

FIG. 2 shows a profile over time t of the current IL1 through the inductance L1 of the half-bridge arranged on the left in FIG. 1. Furthermore FIG. 2 shows the voltage U1 at the point connecting the transistors TR1 and TR2. Also represented are the time-wise profiles of the control voltages UGTR1 and UGTR2 of the transistors TR1 and TR2.

By alternating and phase-displaced switch-on and switch-off of the transistors TR1 and TR2 the current IL1 through the inductance L1 is held in a range between a minimum current I0 and a maximum current Ipk. The difference between maximum current Ipk and minimum current I0 is $\Delta IL1$. If the transistor TR1 is switched on and the transistor TR2 is switched off the voltage U1 is applied across the inductance L1, as a result of which the current IL1 rises linearly. If the transistor TR2 is switched on and the transistor TR1 is switched off voltage Ua is applied across the inductance L1, as a result of which the current IL1 falls linearly.

By altering the minimum current I0 and the maximum current Ipk, in particular with the difference $\Delta IL1$ remaining the same, the average value of the output current Ia of the DC converter 1 can be set up to any value. Here the minimum current I0, however, always remains in the negative region and has a certain minimum magnitude, and in an analogous manner the maximum current Ipk always remains in the positive region and similarly has a certain minimum magnitude. FIG. 2 represents a situation in which the minimum current I0 assumes its highest value.

In order that the passive commutation can take place in a reasonable period of time, the minimum magnitudes of the currents have been set, in a concrete example of embodiment of the invention, at 2 A. Needless to say, depending on the structure of the DC converter 1 other values can also be of advantage. In general the current I0 should be sufficiently large to recharge, together with the inductances L1, L2, the bridge point, even with a maximum input voltage Ub. It should, however, not be too large, since otherwise less energy can be transferred to the output of the DC converter 1. In an advantageous embodiment of the invention, the current I0 is set dependent on the input voltage Ub for this reason.

As can furthermore be discerned from FIG. 2, a pause is provided in each case in the switch-over from one transistor to the other transistor; a pause T1 between the switch-off of the input-side transistor TR1 and the switch-on of the ground-side transistor TR2, and a pause T2 between the switch-off of the ground-side transistor TR2 and the switch-on of the input-side transistor TR1. In the present example the pause T1 is shorter than the pause T2. This is to do with the fact that in the case represented less current at the lower turning point is available for the commutation of the bridge point than at the upper turning point. It is, of course, also conceivable to provide two equally long pauses T1, T2, wherein the pause T1 is appropriately lengthened so that sufficient time for the commutation is also available at the lower turning point. Needless to say, the pause T2 can also be shortened; however, thereby it should be borne in mind that possibly the passive commutation may not then be able to take place to its full conclusion. The pauses T1 and T2 should also be dimensioned such that a bridge short-circuit is reliably avoided.

In the present case the switch-on times T0 of the transistors TR1 and TR2 are of equal length. This is however by no means an essential condition, since in the duty cycle, in other words, the ratio of the period for which the transistors TR1, TR3 positioned on the input side are switched on, to the period for which the transistors TR2, TR4 positioned on the ground side are switched on, the ratio is determined between the input voltage Ue and the output voltage Ua, in other words the voltage ratio.

Figure 3:
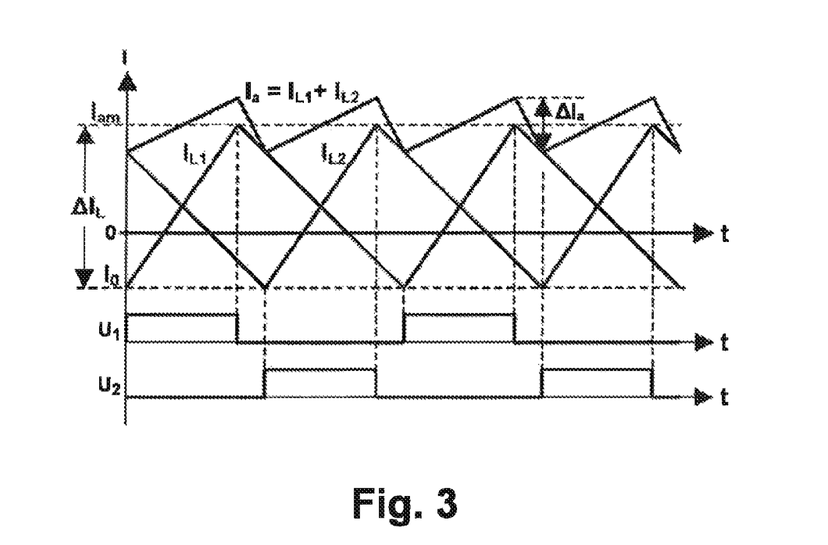
FIG. 3 shows an example of an output current characteristic of the DC converter in accordance with the invention.

FIG. 3 now shows an example of an output-side summation current Ia=IL1+IL2 of both half-bridges. As can easily be discerned the "ripple" $\Delta Ia$ (i.e. the fluctuation of the current) is significantly less than the ripple $\Delta IL$ of the individual choke currents IL1 and IL2. The average value Iam can be either positive or negative, depending on the requirement. To this end, as already mentioned, the maximum current Ipk and the minimum current I0 are appropriately displaced.

Figure 4:
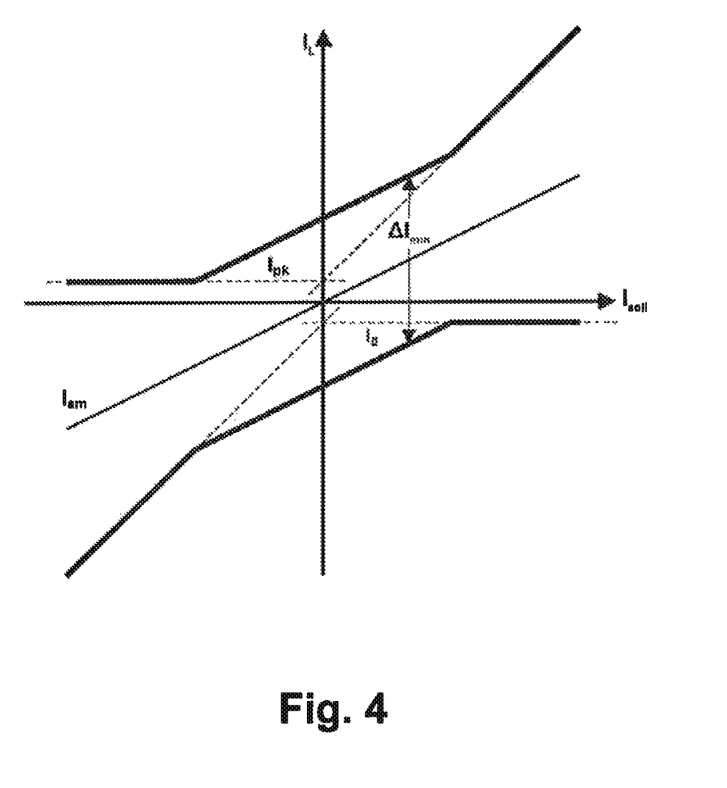
FIG. 4 shows an example of an average output current and the target current of the DC converter in accordance with the invention.

FIG. 4 now shows how the minimum current I0 and the maximum current Ipk in an advantageous variant of the invention are set as a function of a target current Isoll, i.e. of the desired average output current Iam of the DC converter 1. Here the amplitude of the choke current $\Delta IL1$ is reduced at smaller values of Isoll, and at larger values of Isoll it is increased. In FIG. 4 it can moreover be clearly discerned that the minimum current I0 is always negative and has a certain minimum magnitude, and that the maximum current Ipk is always positive and likewise has a certain minimum magnitude.

FIG. 4 is now described for the right-hand half of the diagram; the left-hand half is a rotationally symmetric image of the right-hand half. In the case of a target current Isoll=0 a comparatively small amplitude ΔILmin of the choke current IL is provided in order to reduce the energy losses, in particular the magnetic losses in the inductances L1 and L2. Since Isoll=0, the DC converter 1 at this operating point does not produce any useful power, but only consumes the energy that is generated by the alternating currents IL1 and IL2.

Limits are essentially set to the reduction of the amplitude ΔILmin, by the fact that thereby the frequencies of the alternating currents IL1 and IL2 increase (the gradient of the currents IL1 and IL2 remains in fact the same as the minimum current I0 and maximum current Ipk alter—see also FIG. 2), which also leads to an increase of the power dissipation.

For the ferrite material "K2008", for example, the magnetic losses rise with the square of the amplitude ΔIL1, but only to a power of 1.17 of the frequency. The minimum current I0 and the maximum current Ipk are now optimally set such that a minimum power dissipation is achieved.

When the target current Isoll is increased the minimum current I0 and the maximum current Ipk are now increased, while the amplitude ΔILmin remains the same. The minimum current I0 and the maximum current Ipk thus run parallel to the average output current Iam. In the event of a further increase of the target value Isoll, however, the minimum current I0 cannot be increased any further, since it cannot be allowed to exceed a certain maximum value so as to ensure that passive computation of the transistors T2, T4 positioned on the ground side is possible. The minimum current I0 is therefore held constant as the target current Isoll increases further. However, in order that the average output current Iam rises linearly with the target current Isoll, the maximum current Ipk is now increased at a greater rate. In the diagram this can be discerned in the form of an upward kink.

By means of this preferred variant of the invention are thus brought together low power dissipation at low target currents Isoll, the enabling of passive commutation over the whole operating range (that is to say, for all values of Isoll), and also the linearity between the average output current Iam and the target current Isoll.

At this point it is noted that the profile represented in FIG. 4 shows only one possible variant of the invention. Needless to say, other profiles of the currents represented are also possible. For example, it is not essential that the dependency between the target current Isoll and the average current Iam is linear, although this is advantageous. It would also be possible for the maximum current Ipk to kink upwards at another angle, or at another point. Curved current profiles are, needless to say, also conceivable.

Finally, it should be noted that the variants shown represent only an extract of the many possibilities for a controller 2 in accordance with the invention, and/or a DC converter 1 in accordance with the invention, and may not be called upon to limit the range of application of the invention. For the person skilled in the art it would be a simple matter to adapt the invention to his requirements, based upon the considerations represented here, without thereby moving outside the scope of protection of the invention. Moreover, attention is drawn to the fact that parts of the devices represented in the figures can also form the basis for independent inventions.

REFERENCE LABELS LIST

1 DC converter
2 Controller
ΔIa Amplitude of the output current
ΔIL, ΔIL1 Amplitude of the current through the inductance
ΔImin Minimum value for the current amplitude at the inductance
A Output
Cr First capacitance
Ca Second capacitance
Cb Third capacitance
E Input
GND Ground
I Current
I0 Minimum current
Ia Output current
IL1, IL2 Current through the inductance
Ipk Maximum current
Isoll Target current
L1, L2 Inductance
t Time
T0 Time period for which the transistor is switched on
T1, T2 Switching-over pauses for transistors
TR1 . . . TR4 Transistor
U1, U2 Voltage across the inductance
Ua Output voltage
Ub Input voltage
UGTR1, UGTR2 Control voltage for transistor

What is claimed is:

1. A DC converter comprising:
an input;
an output;
a ground connection;
a first half-bridge, a first switch in said first half-bridge, a second switch connected in series following said first switch between said input and said ground connection, a first switch capacitor connected in parallel to said first switch, and a second switch capacitor connected in parallel to said second switch;
a first inductor, said first inductor being electrically connected to a first half-bridge node point between said first and second switches, and said first inductor being electrically connected to said output;
a second half-bridge in parallel to said first half-bridge, a third switch in said second half-bridge, a fourth switch connected in series following said third switch between said input and said ground connection, a third switch capacitor connected in parallel to said third switch, and a fourth switch capacitor connected in parallel to said fourth switch;
a second inductor, said second inductor being electrically connected to a second half-bridge node point between said third and fourth switches, and said second inductor being electrically connected to said output;
a capacitor connected between said output and said ground connection, and a second capacitor connected between said input and said ground connection;
a controller connected to control said first half-bridge switch, said second half-bridge switch, said third half-bridge switch, and said fourth half-bridge switch;
said controller electrically connected to obtain a first current measurement of current in said first inductor, said controller electrically connected to receive a second current measurement in said second inductor;
said controller configured to switch said second half-bridge switch to an off-state when current in said first inductor is measured as flowing from said output towards said first inductor and measured as attaining a first specifiable threshold magnitude greater than zero, said controller configured to switch said fourth half-bridge switch to an off-state when current in said second inductor is measured as flowing from said output towards said second inductor and measured as attaining the first specifiable threshold magnitude;

said controller configured to switch said first half-bridge switch to an off-state when current in said first inductor is measured as flowing from said first inductor towards said output and measured as attaining a second specifiable threshold magnitude greater than zero, said controller configured to switch said third half-bridge switch to an off-state when current in said second inductor is measured as flowing from said second inductor towards said output and measured as attaining the second specifiable threshold magnitude;

said controller configured to set a first selectively adjustable time pause between switching-off of said first half-bridge switch and switching-on of said second half-bridge switch, said controller configured to set the first selectively adjustable time pause between switching-off of said third half-bridge switch and switching-on of said fourth half-bridge switch; and, said controller configured to set a second selectively adjustable time pause between switching-off of said second half-bridge switch and switching-on of said first half-bridge switch, said controller configured to set the second selectively adjustable time pause between switching-off of said fourth half-bridge switch and switching-on of said third half-bridge switch.

2. The DC converter as claimed in claim 1, wherein:
said first selectively adjustable time pause is of equal length to said second selectively adjustable time pause.

3. The DC converter as claimed in claim 1, wherein:
said first selectively adjustable time pause is of shorter duration than said second selectively adjustable time pause if current on average is flowing from a respective inductor to said output.

4. The DC converter as claimed in claim 1, wherein:
said first selectively adjustable time pause is of longer duration than said second selectively adjustable time pause if current on average is flowing from said output to a respective inductor.

5. The DC converter as claimed in claim 1, wherein:
said first selectively adjustable time pause is of shorter duration than said second selectively adjustable time pause if current on average is flowing from a respective inductor to said output; and,
said first selectively adjustable time pause is of longer duration than said second selectively adjustable time pause if current on average is flowing from said output to a respective inductor.

6. A DC converter as claimed in claim 1, further comprising:
at least one of said first, second, third, and fourth half-bridge switches is a MOSFET.

7. A DC converter as claimed in claim 1, further comprising:
at least one of said first, second, third, and fourth half-bridge switches includes a bipolar transistor.

8. A DC converter comprising:
an input;
an output;
a ground connection;
an integral number n of parallel half-bridges each including a respective first switch, a respective second switch connected in series following said respective first switch between said input and said ground connection, a respective first switch capacitor connected in parallel to said respective first switch, and a respective second switch capacitor connected in parallel to said second switch;

for each respective one of said n half-bridges a respective inductor, said respective inductor being electrically connected to a respective half-bridge node point between said respective first and respective second switches, and said respective inductor being electrically connected to said output;

a controller connected to control each of said n respective half-bridge first switches and each of said respective half-bridge second switches;

said controller electrically connected to obtain a first current measurement of current in each said respective inductor;

said controller configured to switch, in each respective one of said plurality n of half-bridges, said respective second switch to an off-state when current in said respective inductor is measured as flowing from said output towards said respective inductor and measured as attaining a first specifiable threshold magnitude greater than zero;

said controller configured to switch, in each respective one of said plurality n of half-bridges, said respective first switch to an off-state when current in said respective inductor is measured as flowing from said respective inductor towards said output and measured as attaining a second specifiable threshold magnitude greater than zero;

said controller configured to set a first selectively adjustable time pause between switching-off of a respective half-bridge first switch and switching-on of a respective half-bridge second switch; and, said controller configured to set a second selectively adjustable time pause between switching-off of a respective half-bridge second switch and switching-on of a respective half-bridge first switch.

9. The DC converter as claimed in claim 8, wherein:
said first selectively adjustable time pause is of equal length to said second selectively adjustable time pause.

10. The DC converter as claimed in claim 8, wherein:
said first selectively adjustable time pause is of shorter duration than said second selectively adjustable time pause if current on average is flowing from a respective inductor to said output.

11. The DC converter as claimed in claim 8, wherein:
said first selectively adjustable time pause is of longer duration than said second selectively adjustable time pause if current on average is flowing from said output to a respective inductor.

12. The DC converter as claimed in claim 8, wherein:
said first selectively adjustable time pause is of shorter duration than said second selectively adjustable time pause if current on average is flowing from a respective inductor to said output; and,
said first selectively adjustable time pause is of longer duration than said second selectively adjustable time pause if current on average is flowing from said output to a respective inductor.

13. The DC converter as claimed in claim 8, wherein:
said controller is configured to activate said n parallel half-bridges in synchronous frequency at a phase displacement of 360°/n.

14. A DC converter as claimed in claim 8, further comprising:
a capacitor connected between said output and said ground connection.

15. A DC converter as claimed in claim 14, further comprising:
 a second capacitor connected between said input and said ground connection.

16. A method of operating a DC converter comprising steps of:
 measuring current at an inductor;
 switching a second switch of a half-bridge associated with the inductor to an off-state when current in the inductor is measured as flowing from a converter output towards the inductor and also measured as attaining a first specifiable threshold magnitude greater than zero;
 switching a first switch to an off-state when current in said respective inductor is measured as flowing from the inductor towards the converter output and also measured as attaining a second specifiable threshold magnitude greater than zero;
 setting a first selectively adjustable time pause between switching-off of the first switch and switching-on of the second switch; and,
 setting a second selectively adjustable time pause between switching-off of the second switch and switching-on of the first switch.

17. A method of operating a DC converter as claimed in claim 16, further comprising the step of:
 setting the first selectively adjustable time pause to be of equal length to the second selectively adjustable time pause.

18. A method of operating a DC converter as claimed in claim 16, further comprising the step of:
 setting the first selectively adjustable time pause to be of shorter duration than the second selectively adjustable time pause if current on average is flowing from the inductor to the converter output.

19. A method of operating a DC converter as claimed in claim 18, further comprising the step of:
 setting the first selectively adjustable time pause to be of longer duration than the second selectively adjustable time pause if current on average is flowing from the converter output to the inductor.

20. A method of operating a DC converter as claimed in claim 16, further comprising the step of:
 continuously adapting the ratio of the first and second selectively adjustable time pauses to the level of the average output current.

\* \* \* \* \*